(12) United States Patent
Chen et al.

(10) Patent No.: US 12,101,015 B2
(45) Date of Patent: Sep. 24, 2024

(54) HIGH-SPEED MOTOR AND ASSEMBLING METHOD THEREOF

(71) Applicant: Shenzhen FeiYida Motor Limited Company, Shenzhen (CN)

(72) Inventors: Shaoyou Chen, Shenzhen (CN); Yong Gu, Shenzhen (CN); Jianhua Zhao, Shenzhen (CN)

(73) Assignee: SHENZHEN FEIYIDA MOTOR LIMITED COMPANY, Shenzhen (CN)

( * ) Notice: Subject to any disclaimer, the term of this patent is extended or adjusted under 35 U.S.C. 154(b) by 359 days.

(21) Appl. No.: 17/578,488

(22) Filed: Jan. 19, 2022

(65) Prior Publication Data

US 2022/0140693 A1  May 5, 2022

(51) Int. Cl.
*H02K 1/20* (2006.01)
*H02K 5/20* (2006.01)
*H02K 7/08* (2006.01)

(52) U.S. Cl.
CPC ............... *H02K 7/085* (2013.01); *H02K 1/20* (2013.01); *H02K 5/20* (2013.01)

(58) Field of Classification Search
CPC .. H02K 9/02; H02K 9/04; H02K 9/06; H02K 5/20; H02K 1/12; H02K 11/30
See application file for complete search history.

(56) References Cited

U.S. PATENT DOCUMENTS

| 2016/0072344 A1 | 3/2016 | Durantay et al. | |
| 2016/0164357 A1* | 6/2016 | Yang et al. | H02K 3/24 |
| | | | 310/59 |
| 2017/0366070 A1* | 12/2017 | Iso | H02K 9/02 |
| | | | 310/58 |
| 2018/0367010 A1 | 12/2018 | Han et al. | |
| 2019/0089290 A1 | 3/2019 | Shenoy et al. | |
| 2021/0050762 A1* | 2/2021 | Tsuchida et al. | H02K 5/20 |
| | | | 15/347 |

FOREIGN PATENT DOCUMENTS

CN  207664812 U  * 7/2018 ............ H02K 9/06

OTHER PUBLICATIONS

Machine translation of CN207664812U (Year: 2017).*
worldwide.espacenet.com translation of CN207664812U (Year: 2018).*

* cited by examiner

*Primary Examiner* — Michael Andrews
*Assistant Examiner* — Selim R Zoorob
(74) *Attorney, Agent, or Firm* — Hemisphere Law, PLLC; Zhigang Ma

(57) ABSTRACT

The present disclosure discloses a high-speed motor and an assembling method. The high-speed motor includes an air duct housing, a rotor subassembly, a stator subassembly, a bearing sleeve subassembly, and a fan blade. A mounting ring coaxial with the air duct housing is arranged at the middle right part in the air duct housing; several air guide plates are uniformly distributed between an outer wall of the mounting ring and an inner wall of the air duct housing; a bearing sleeve mounting cavity, a bearing mounting cavity, and a stator mounting cavity being respectively arranged at a left part, a middle part and a right part in the mounting ring; the rotor subassembly is coaxial with the mounting ring and is mounted in the mounting ring in a horizontal direction. The present disclosure has the advantages of reducing the resonance, lowering the noise, and the like.

4 Claims, 3 Drawing Sheets

HIGH-SPEED MOTOR AND ASSEMBLING METHOD THEREOF

TECHNICAL FIELD

The present disclosure belongs to the technical field of motors, and specifically relates to a high-speed motor and an assembling method thereof.

BACKGROUND

Due to high speed, the volume of a high-speed motor is much smaller than that of an ordinary-power motor, and the high-speed motor cancels a traditional deceleration mechanism. The high-speed motor has the advantages of high motor power density, effective material saving, high transmission efficiency, fast dynamic response, and the like. However, the high-speed motor used on an electrical appliance, such as a fan, an air blower and a dust collector, used by a customer in the current market still has the problem of large electromagnetic noise, etc. during high-speed operation.

SUMMARY

In order to solve the deficiencies in the existing art, the present disclosure provides a high-speed motor with small electromagnetic noise during operation and an assembling method thereof.

In order to solve the above technical problems, the present disclosure adopts the following technical solution:

A high-speed motor includes:
- an air duct housing, a mounting ring coaxial with the air duct housing being arranged at the middle right part in the air duct housing, several air guide plates being uniformly distributed between an outer wall of the mounting ring and an inner wall of the air duct housing, and a bearing sleeve mounting cavity, a bearing mounting cavity, and a stator mounting cavity being respectively arranged at a left part, a middle part and a right part in the mounting ring;
- a rotor subassembly which is coaxial with the mounting ring and is mounted in the mounting ring in a horizontal direction, a left part of the rotor subassembly leftwards extending out of the mounting ring and the air dust housing in sequence to a left side of the air duct housing, and a right part of the rotor subassembly rightwards extending to a right side of the air duct housing;
- a bearing sleeve subassembly which is assembled at the middle left part of the rotor subassembly, the middle left part of the bearing sleeve subassembly being located in the bearing sleeve mounting cavity, and the right part of the bearing sleeve subassembly being located in the bearing mounting cavity;
- a stator subassembly which is assembled on the middle right part of the rotor subassembly and is located in the stator mounting cavity, a right part of the stator subassembly rightwards extending out of the air duct housing; and
- a fan blade which is assembled on the left part of the rotor subassembly on the left side of the mounting ring in the air duct housing.

The rotor subassembly includes a motor shaft, a positioning copper sleeve, and a magnet; the motor shaft and the mounting ring are axially disposed, and the motor shaft is mounted in the mounting ring in the horizontal direction; a left part of the motor shaft leftwards extends out of the mounting ring and the air dust housing in sequence to the left side of the air duct housing, and a right part of the motor shaft rightwards extends to the right side of the air duct housing; the positioning copper sleeve is mounted at the middle left part of the motor shaft and is located in the bearing sleeve mounting cavity; the magnet is mounted at the middle right part of the motor shaft and is located in the stator mounting cavity; and the fan blade is mounted at the left part of the motor shaft and is located on the left side of the mounting ring in the air duct housing.

The bearing sleeve subassembly includes a first bearing, a second bearing, a first bearing shock absorption sleeve, a second bearing shock absorption sleeve, and a center copper sleeve; the first bearing shock absorption sleeve is sleeved on the first bearing; the second bearing shock absorption sleeve is sleeved on the second bearing; the center copper sleeve is sleeved on the first bearing shock absorption sleeve; the first bearing is sleeved on the motor shaft on the left side of the positioning copper sleeve, and the right side of the first bearing is in resisting connection with the left side of the positioning copper sleeve; the second bearing is sleeved on the motor shaft on the right side of the positioning bearing, and the left side of the second bearing is in resisting connection with the right side of the positioning copper sleeve; an outer wall of the center copper sleeve resists against an inner wall of the bearing sleeve mounting cavity of the mounting ring; an outer wall of the second bearing shock absorption sleeve resists against an inner wall of the bearing mounting cavity of the mounting ring; and an outer wall of the positioning copper sleeve is spaced apart from the inner wall of the bearing sleeve mounting cavity of the mounting ring.

The stator subassembly includes a plastic-coated frame, a power board plugin, several conductive needles, and several coil windings; an outer wall of the plastic-coated frame is provided with a winding stator; the several coil windings are wound on the outer side of the winding stator; the several conductive needles are plugged on a right part of the plastic-coated frame, and right parts of the several conductive needles rightwards extend to the right side of the plastic-coated frame; the power board plugin is located on the right sides of the several conductive needles, and the right parts of the several conductive needles are welded on the power board plugin; the plastic-coated frame and the several coil windings are assembled in the stator mounting cavity, and the right parts of the plastic-coated frame and the several coil windings rightwards extend to the right side of the air duct housing; and the plastic-coated frame is sleeved on the magnet.

The first bearing shock absorption sleeve and the second bearing shock absorption sleeve are made of a silica gel material, and the center copper sleeve is made of a brass material.

The present disclosure further discloses an assembling method of the high-speed motor, including the following steps:

(1) preparing the motor shaft and the positioning copper sleeve, and assembling the positioning copper sleeve on the middle left part of the motor shaft;

(2) preparing the first bearing, the second bearing, the first bearing shock absorption sleeve, the second bearing shock absorption sleeve, and the center copper sleeve, then assembling the first bearing on the motor shaft on the left side of the positioning copper sleeve in a manner of causing the right side of the first bearing to resist against the left side of the positioning copper sleeve, assembling the second bearing on the motor shaft on the right side of the positioning copper sleeve in a manner of causing the left side of the second bearing to resist against the right side of the positioning copper sleeve, sleeving the first bearing shock absorption sleeve on the first bearing, sleeving the second bearing shock absorption sleeve on the second bearing, and sleeving the center copper sleeve on the first bearing shock absorption sleeve;

(3) preparing the air duct housing, coaxially assembling the motor shaft in the mounting ring of the air duct housing, causing the outer wall of the second bearing shock absorption sleeve to resist against the inner wall of the bearing mounting cavity of the mounting ring, and causing the outer wall of the center copper sleeve to resist against the inner wall of the bearing sleeve mounting cavity of the mounting ring;

(4) preparing the magnet, assembling the magnet on the middle right part of the motor shaft, then preparing the plastic-coated frame provided with the winding stator, winding the coil windings on the outer side of the winding stator on the plastic-coated frame, assembling the several conductive needles on the right part of the plastic-coated frame, and wiring the conductive needles;

(5) assembling the plastic-coated frame on the magnet at the middle right part of the motor shaft, and assembling the middle left part of the plastic-coated frame in the stator mounting cavity;

(6) assembling the fan blade on the left part of the motor shaft;

(7) preparing the power board plugin, and welding the right parts of the several conductive needles on the power board plugin to complete the assembling.

By adopting the above technical solutions, the present disclosure has the following beneficial effects.

(1) In the present disclosure, the bearing sleeve subassembly is disposed, which includes the first bearing, the second bearing, the first bearing shock absorption sleeve, the second bearing shock absorption sleeve, the center copper sleeve, and other parts; the first bearing shock absorption sleeve and the second bearing shock absorption sleeve are made of the silica gel material, so they have high-temperature-resistant and wear-resistant characteristics, have automatic core adjustment and shock absorption functions, and can provide an axial pre-pressure for the first bearing and the second bearing, respectively, so that the resonance phenomenon caused by the motor shaft and other parts during the high-speed operation of the present disclosure is reduced, and the noise is effectively lowered;

(2) in the present disclosure, the center copper sleeve is disposed; the arrangement of the center copper sleeve ensures the concentricity; axial pressures on the center copper sleeve and the first bearing are consistent, which can effectively protect the first bearing and lower the noise.

In conclusion, the present disclosure has the advantages of reducing the resonance, lowering the noise, and the like.

DETAILED DESCRIPTION OF THE EMBODIMENTS

Figure 1:
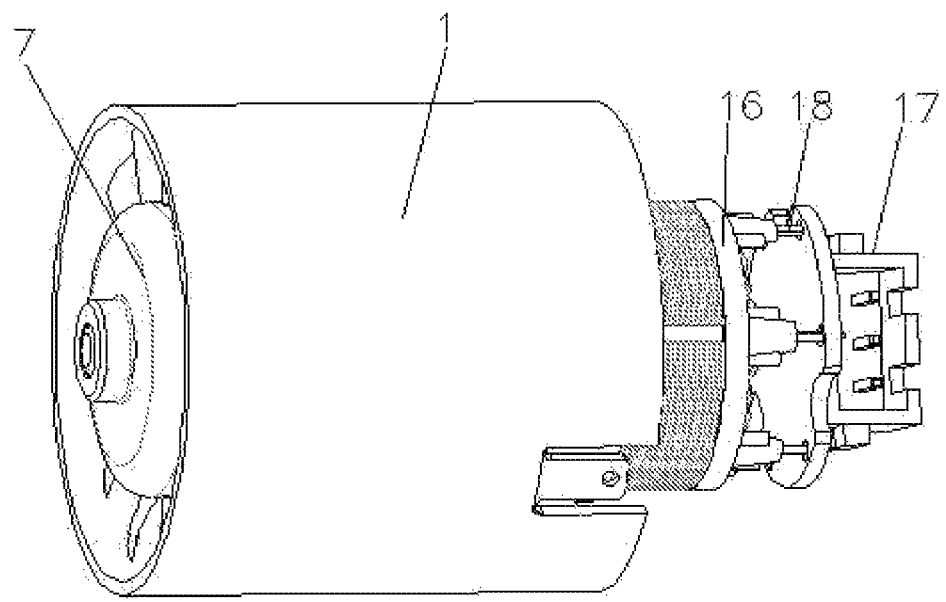
FIG. 1 is a schematic structural diagram of the present disclosure.

The technical solutions of the present disclosure will be clearly and completely described below in conjunction with the accompanying drawings. Apparently, the described embodiments are only a part of the embodiments of the present disclosure, rather than all the embodiments.

The components of the embodiments of the present disclosure generally described and shown in the drawings here can be arranged and designed in a variety of different configurations. Therefore, the following detailed description for the embodiments of the present disclosure provided in the accompanying drawings is not intended to limit the scope of the claimed present disclosure, but merely represents selected embodiments of the present disclosure.

Based on the embodiments in the present disclosure, all other embodiments obtained by those of ordinary skill in the art without creative work shall fall within the protection scope of the present disclosure.

In the description of the present disclosure, it should be noted that orientations or positional relationships indicated by the terms "center", "upper", "lower", "left", "right", "vertical", "horizontal", "inside", "outside", and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms are not construed as limiting the present disclosure. In addition, the terms "first", "second" and "third" are only for the purpose of description, and may not be understood as indicating or implying the relative importance.

In the description of the present disclosure, it should be also noted that unless otherwise explicitly defined and defined, the terms "mounted", "coupled" and "connected" shall be understood broadly, and may be, for example, fixedly connected, or detachably connected, or integrally connected, or mechanically connected, or electrically connected, or directly connected, or indirectly connected through an intermediate medium, or interconnection between two elements. Those of ordinary skill in the art can understand the specific meanings of the above terms in the present disclosure according to specific situations.

Figure 2:
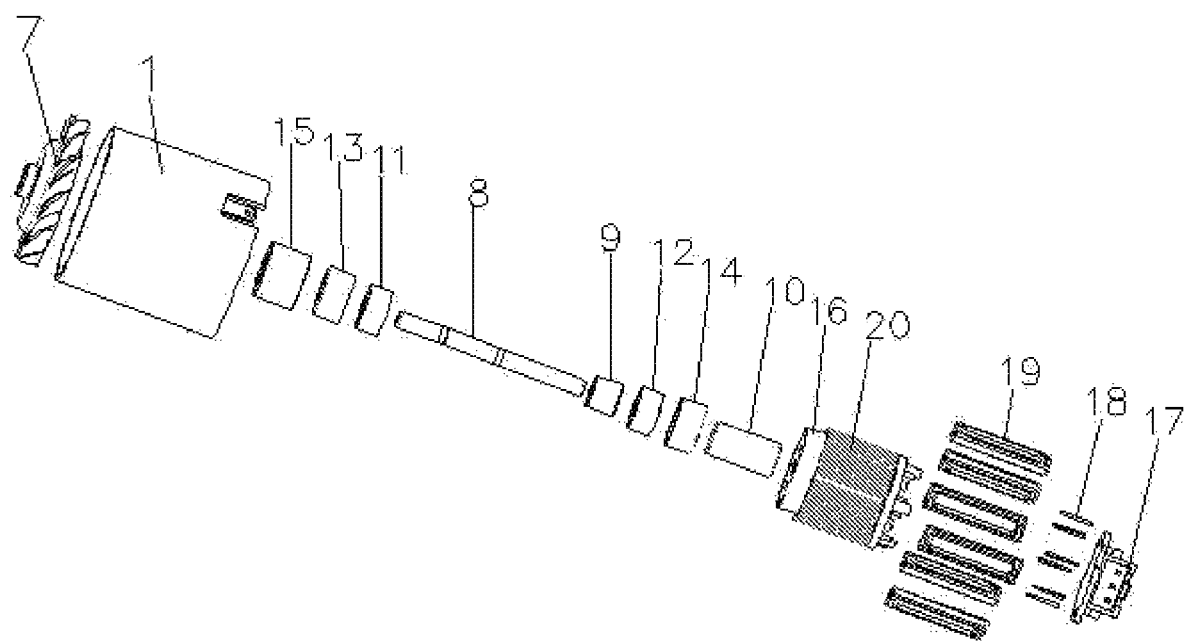
FIG. 2 is an exploded diagram of FIG. 1.
Figure 3:
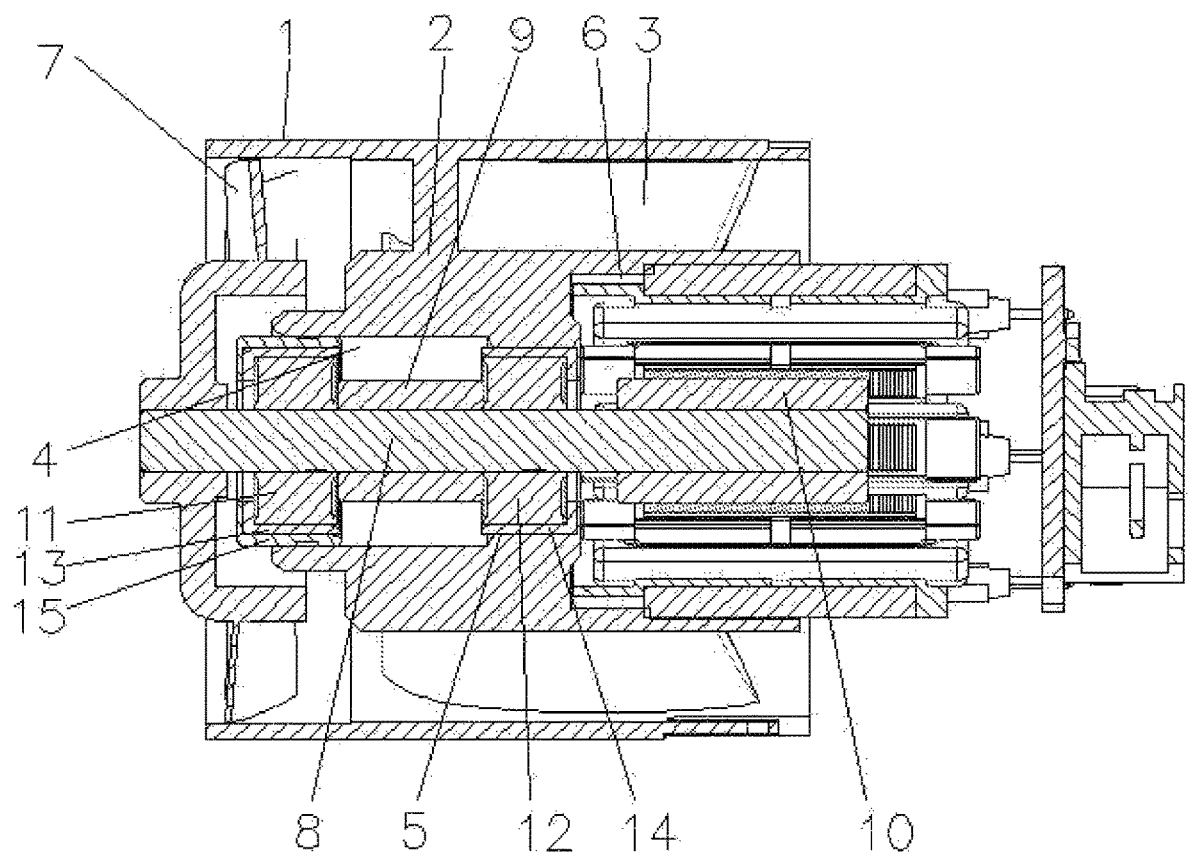
FIG. 3 is a sectional view of the present disclosure.

As shown in FIGS. 1-3, a high-speed motor of the present disclosure includes:

an air duct housing 1, wherein a mounting ring 2 coaxial with the air duct housing 1 is arranged at the middle right part in the air duct housing 1; several air guide plates 3 are uniformly distributed between an outer wall of the mounting ring 2 and an inner wall of the air duct housing 1; the air guide plates 3 are arc-shaped to ensure fluent flowing out of air; a bearing sleeve mounting cavity 4, a bearing mounting cavity 5, and a stator mounting cavity 6 are respectively arranged at a left part, a middle part and a right part in the mounting ring 2; the air duct housing 1 of the present disclosure is formed by performing die casting on a zinc alloy material; the bearing sleeve mounting cavity 4 and the stator mounting cavity 6 are molded at one time by fine machining of a numerically-controlled machine tool, so that the concentricity can be effectively ensured; the bearing sleeve mounting cavity 4, the bearing mounting cavity 5, and the stator mounting cavity 6 are columnar; an inner diameter of the bearing sleeve mounting cavity 4 is greater than that of the bearing mounting cavity 5 and less than that of the stator mounting cavity 6;

a rotor subassembly which is coaxial with the mounting ring 2 and is mounted in the mounting ring 2 in a horizontal direction, wherein a left part of the rotor subassembly leftwards extends out of the mounting ring 2 and the air dust housing 1 in sequence to a left side of the air duct housing 1, and a right part of the rotor subassembly rightwards extends to a right side of the air duct housing 1;
- a bearing sleeve subassembly which is assembled at the middle left part of the rotor subassembly, wherein the middle left part of the bearing sleeve subassembly is located in the bearing sleeve mounting cavity 4, and the right part of the bearing sleeve subassembly is located in the bearing mounting cavity 5;
- a stator subassembly which is assembled on the middle right part of the rotor subassembly and is located in the stator mounting cavity 6, wherein a right part of the stator subassembly rightwards extends out of the air duct housing 1; and
- a fan blade 7 which is assembled on the left part of the rotor subassembly on the left side of the mounting ring 2 in the air duct housing 1, wherein the fan blade 7 of the present disclosure has a curved surface on a blade, and 11 to 15 blades may be selected; and the blades can be in different angles to cooperate with the present disclosure with different air volumes, so as to increase and output a larger air volume.

The rotor subassembly includes a motor shaft 8, a positioning copper sleeve 9, and a magnet 10. A mounting slot for the positioning copper sleeve 9 and a mounting slot for the magnet 10 are respectively formed in the middle left part and the middle right part of the motor shaft 8 of the present disclosure and are respectively used for positioning and mounting the positioning copper sleeve 9 and the magnet 10. The motor shaft 8 and the mounting ring 2 are axially disposed, and the motor shaft 8 is mounted in the mounting ring 2 in the horizontal direction; a left part of the motor shaft 8 leftwards extends out of the mounting ring 2 and the air dust housing 1 in sequence to the left side of the air duct housing 1, and a right part of the motor shaft 8 rightwards extends to the right side of the air duct housing 1; the positioning copper sleeve 9 is mounted at the middle left part of the motor shaft 8 and is located in the bearing sleeve mounting cavity 4; the magnet 10 is mounted at the middle right part of the motor shaft and is located in the stator mounting cavity 6; and the fan blade 7 is mounted at the left part of the motor shaft 8 and is located on the left side of the mounting ring 2 in the air duct housing 1.

The bearing sleeve subassembly includes a first bearing 11, a second bearing 12, a first bearing shock absorption sleeve 13, a second bearing shock absorption sleeve 14, and a center copper sleeve 15. The first bearing shock absorption sleeve 13 and the second bearing shock absorption sleeve 14 are made of a high-temperature-resistant and wear-resistant material, such as a silica gel material, so they have automatic core adjustment and shock absorption functions, can provide an axial pre-pressure for the first bearing 11 and the second bearing 12, respectively, and can reduce the resonance phenomenon caused by the motor shaft 8 and other parts during the high-speed operation of the present disclosure and effectively lower the noise. The center copper sleeve 15 is made of a brass material and is molded by fine machining of a numerically-controlled machine tool, so that the concentricity of the present disclosure can be ensured. Axial pressures on the center copper sleeve 15 and the first bearing 11 are consistent, which can effectively protect the first bearing 11 and lower the noise. The first bearing shock absorption sleeve 13 is sleeved on the first bearing 11; the second bearing shock absorption sleeve 14 is sleeved on the second bearing 12; the center copper sleeve 15 is sleeved on the first bearing shock absorption sleeve 13; the first bearing 11 is sleeved on the motor shaft 8 on the left side of the positioning copper sleeve 9, and the right side of the first bearing 11 is in resisting connection with the left side of the positioning copper sleeve 9; the second bearing 12 is sleeved on the motor shaft 8 on the right side of the positioning bearing, and the left side of the second bearing 12 is in resisting connection with the right side of the positioning copper sleeve 9; an outer wall of the center copper sleeve 15 resists against an inner wall of the bearing sleeve mounting cavity 4 of the mounting ring 2; an outer wall of the second bearing shock absorption sleeve 14 resists against an inner wall of the bearing mounting cavity 5 of the mounting ring 2; and an outer wall of the positioning copper sleeve 9 is spaced apart from the inner wall of the bearing sleeve mounting cavity 4 of the mounting ring 2.

The stator subassembly includes a plastic-coated frame 16, a power board plugin 17, several conductive needles 18, and several coil windings 19; and an outer wall of the plastic-coated frame 16 is provided with a winding stator 20. The winding stator 20 of the present disclosure is formed by performing stamping and lap riveting on one kind of steel material in a plastic die by injection-molding. The winding stator 20 is provided with six slots and two electrodes. The several coil windings 19 are wound on the outer side of the winding stator 20, that is, the several coil windings 19 are wound and assembled on the outer side of the winding stator 20. The several conductive needles 18 are plugged on a right part of the plastic-coated frame 16, and right parts of the several conductive needles 18 rightwards extend to the right side of the plastic-coated frame 16; the power board plugin 17 is located on the right sides of the several conductive needles 18, and the right parts of the several conductive needles 18 are welded on the power board plugin 17; the plastic-coated frame 16 and the several coil windings 19 are assembled in the stator mounting cavity 6, and the right parts of the plastic-coated frame 16 and the several coil windings 19 rightwards extend to the right side of the air duct housing 1; and the plastic-coated frame 16 is sleeved on the magnet 10. The present disclosure can achieve high-speed rotation of the motor shaft 8, so as to drive the fan blade 7 and the like to rotate at a high speed to meet the requirements of the market for motors rotating at high speeds. The high-speed motor has high speed and low noise.

The present disclosure further discloses an assembling method of the high-speed motor, including the following steps:
(1) the motor shaft 8 and the positioning copper sleeve 9 are prepared, and the positioning copper sleeve 9 is assembled on the middle left part of the motor shaft 8;
(2) the first bearing 11, the second bearing 12, the first bearing shock absorption sleeve 13, the second bearing shock absorption sleeve 14, and the center copper sleeve 15 are assembled; the first bearing 11 is assembled on the motor shaft 8 on the left side of the positioning copper sleeve 9 in a manner of causing the right side of the first bearing 11 to resist against the left side of the positioning copper sleeve 9; the second bearing 12 is assembled on the motor shaft 8 on the right side of the positioning copper sleeve 9 in a manner of causing the left side of the second bearing to resist against the right side of the positioning copper sleeve 9; the first bearing shock absorption sleeve 13 is sleeved on the first bearing 11; the second bearing shock absorption sleeve 14 on the second bearing 12; the center copper sleeve 15 is sleeved on the first bearing shock absorption sleeve 13;

(3) the air duct housing 1 is prepared; the motor shaft 8 is coaxially assembled in the mounting ring 2 of the air duct housing 1; the outer wall of the second bearing shock absorption sleeve is caused to resist against the inner wall of the bearing mounting cavity 5 of the mounting ring 2; the outer wall of the center copper sleeve 15 is caused to resist against the inner wall of the bearing sleeve mounting cavity 4 of the mounting ring 2;

(4) the magnet 10 is prepared and is assembled on the middle right part of the motor shaft 8; the plastic-coated frame 16 provided with the winding stator 20 is prepared; the coil windings 19 are wound on the outer side of the winding stator 20 on the plastic-coated frame 16; the several conductive needles 18 are assembled on the right part of the plastic-coated frame 16 and are wired;

(5) the plastic-coated frame 16 is assembled on the magnet 10 at the middle right part of the motor shaft 8, and the middle left part of the plastic-coated frame 16 is assembled in the stator mounting cavity 6;

(6) the fan blade 7 is assembled on the left part of the motor shaft 8;

(7) the power board plugin 17 s prepared, and the right parts of the several conductive needles 18 are welded on the power board plugin 17 to complete the assembling.

This embodiment does not limit the shape, material, structure, etc. of the present disclosure in any form. Any simple modification, equivalent change and modification made to the above embodiment according to the technical essence of the present disclosure shall all fall within the protection scope of the technical solution of the present disclosure.

What is claimed is:

1. A high-speed motor, comprising:
an air duct housing having a left end and a right end opposite to the left end, wherein the left end and the right end are arranged along a longitudinal direction of the air duct housing;
a mounting ring coaxial with the air duct housing being arranged at the middle right part in the air duct housing, several air guide plates being uniformly distributed between an outer wall of the mounting ring and an inner wall of the air duct housing, the mounting ring comprises a left part adjacent to the left end of the air duct housing, a middle part positioned at a side of the left part away from the left end of the air duct housing and a right part positioned at a side of the middle part away from the left part, the left part, the middle part and the right part of the mounting ring are arranged along a longitudinal direction of the mounting ring, and a bearing sleeve mounting cavity, a bearing mounting cavity, and a stator mounting cavity being respectively arranged at the left part, the middle part and the right part of the mounting ring;
a rotor subassembly which is coaxial with the mounting ring and is mounted in the mounting ring in a horizontal direction, a left part of the rotor subassembly leftwards extending out of the mounting ring and the air dust housing in sequence to a left side of the air duct housing through the left end of the air duct housing, and a right part of the rotor subassembly opposite to the left part of the rotor subassembly rightwards extending out of the air duct housing to a right side of the air duct housing through the right end of the air duct housing;
a bearing sleeve subassembly which sleeves on the rotor subassembly, a left part of the bearing sleeve subassembly being located in the bearing sleeve mounting cavity, and a right part of the bearing sleeve subassembly being located in the bearing mounting cavity;
a stator subassembly which is assembled around an out wall of the right part of the rotor subassembly and is partially located in the stator mounting cavity, a right part of the stator subassembly rightwards extending out of the air duct housing through the right end of the air duct housing; and
a fan blade which is assembled on the left part of the rotor subassembly and is located on a left side of the mounting ring away from the stator subassembly in the air duct housing;
wherein the rotor subassembly comprises a motor shaft, a positioning copper sleeve, and a magnet; the motor shaft and the mounting ring are coaxially disposed, and the motor shaft is mounted in the mounting ring in the horizontal direction; a left part of the motor shaft leftwards extends out of the mounting ring and the air dust housing in sequence to the left side of the air duct housing through the left end of the air duct housing, and a right part of the motor shaft rightwards extends to the right side of the air duct housing through the right end of the air duct housing; the positioning copper sleeve sleeves on the motor shaft and is located in the bearing sleeve mounting cavity; the magnet is mounted at the right part of the motor shaft and is partially located in the stator mounting cavity; and the fan blade is mounted at the left part of the motor shaft;
wherein the bearing sleeve subassembly comprises a first bearing, a second bearing, a first bearing shock absorption sleeve, a second bearing shock absorption sleeve, and a center copper sleeve; the first bearing shock absorption sleeve is sleeved on the first bearing; the second bearing shock absorption sleeve is sleeved on the second bearing; the center copper sleeve is sleeved on the first bearing shock absorption sleeve; the positioning copper sleeve resists between the first bearing and the second bearing; an outer wall of the center copper sleeve resists against an inner wall of the bearing sleeve mounting cavity of the mounting ring; an outer wall of the second bearing shock absorption sleeve resists against an inner wall of the bearing mounting cavity of the mounting ring; and an outer wall of the positioning copper sleeve is spaced apart from the inner wall of the bearing sleeve mounting cavity of the mounting ring.

2. The high-speed motor according to claim 1, wherein the stator subassembly comprises a plastic-coated frame, a power board plugin, several conductive needles, and several coil windings; an outer wall of the plastic-coated frame is provided with a winding stator; the several coil windings are wound on—an outer wall of the winding stator; the several conductive needles are plugged on a right part of the plastic-coated frame away from the middle part of the mounting ring, the power board plugin is located on a right side of the plastic-coated frame away from the middle part of the mounting ring, and—distal ends of the several conductive needles away from the plastic-coated frame are welded on the power board plugin; the plastic-coated frame and the several coil windings are partially assembled in the stator mounting cavity, and right parts of the plastic-coated frame and the several coil windings rightwards extend to the right side of the air duct housing through the right end of the air duct housing; and the plastic-coated frame is sleeved on the magnet.

3. The high-speed motor according to claim 2, wherein the first bearing shock absorption sleeve and the second bearing shock absorption sleeve are made of a silica gel material, and the center copper sleeve is made of a brass material.

4. An assembling method of the high-speed motor according to claim 3, comprising the following steps:
preparing the motor shaft and the positioning copper sleeve, and assembling the positioning copper sleeve on the motor shaft;
preparing the first bearing, the second bearing, the first bearing shock absorption sleeve, the second bearing shock absorption sleeve, and the center copper sleeve, then assembling the first bearing on the motor shaft on a left side of the positioning copper sleeve in a manner of causing a right side of the first bearing to resist against the left side of the positioning copper sleeve, assembling the second bearing on the motor shaft on a right side of the positioning copper sleeve in a manner of causing a left side of the second bearing to resist against the right side of the positioning copper sleeve, sleeving the first bearing shock absorption sleeve on the first bearing, sleeving the second bearing shock absorption sleeve on the second bearing, and sleeving the center copper sleeve on the first bearing shock absorption sleeve;
preparing the air duct housing, coaxially assembling the motor shaft in the mounting ring of the air duct housing, causing the outer wall of the second bearing shock absorption sleeve to resist against the inner wall of the bearing mounting cavity of the mounting ring, and causing the outer wall of the center copper sleeve to resist against the inner wall of the bearing sleeve mounting cavity of the mounting ring;
preparing the magnet, assembling the magnet on the right part of the motor shaft, then preparing the plastic-coated frame provided with the winding stator, winding the coil windings on the outer wall of the winding stator on the plastic-coated frame, assembling the several conductive needles on the right part of the plastic-coated frame, and wiring the conductive needles;
assembling the plastic-coated frame on the magnet at the right part of the motor shaft, and assembling the plastic-coated frame in the stator mounting cavity;
assembling the fan blade on the left part of the motor shaft;
preparing the power board plugin, and welding the right parts distal ends of the several conductive needles on the power board plugin to complete the assembling.

* * * * *